(12) United States Patent
Hall et al.

(10) Patent No.: US 6,317,213 B1
(45) Date of Patent: *Nov. 13, 2001

(54) UNBALANCED FIBER OPTIC MICHELSON INTERFEROMETER AS AN OPTICAL PICK-OFF

(75) Inventors: David B. Hall, La Crescenta; Samuel N. Fersht, Studio City, both of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/114,582

(22) Filed: Jul. 13, 1998

Related U.S. Application Data

(63) Continuation-in-part of application No. 08/848,090, filed on Jun. 6, 1997, now Pat. No. 5,949,740.

(51) Int. Cl.[7] ........................................ G01B 9/02
(52) U.S. Cl. .................. 356/450; 356/35.5; 356/477
(58) Field of Search .................. 356/35.5, 450, 356/478, 477, 482

(56) References Cited

U.S. PATENT DOCUMENTS

| | | | |
|---|---|---|---|
| 4,428,239 | * 1/1984 | Johnston | 73/705 |
| 4,446,543 | 5/1984 | McLandrich et al. | 367/149 |
| 4,678,909 | * 7/1987 | Jackson et al. | 250/231 |
| 4,799,797 | 1/1989 | Huggins | 356/345 |
| 5,087,124 | * 2/1992 | Smith et al. | 356/358 |
| 5,218,420 | * 6/1993 | Asmar | 356/352 |
| 5,448,058 | 9/1995 | Arab-Sadeghabadi et al. | 250/225 |
| 5,505,804 | * 4/1996 | Furstenau | 356/345 |
| 5,529,671 | 6/1996 | Debley et al. | 204/192.34 |
| 5,675,415 | 10/1997 | Akatsu et al. | 356/364 |
| 5,680,489 | * 10/1997 | Kersey | 385/12 |
| 5,949,740 | * 9/1999 | Hall | 367/149 |

FOREIGN PATENT DOCUMENTS

| | | | |
|---|---|---|---|
| 0196784 | 10/1986 | (EP) | G01L/9/00 |
| 8-35811 | 2/1996 | (JP) | G01B/11/00 |
| 09005028 | 1/1997 | (JP) | G01B/11/00 |
| 2-302632 | 12/1990 | (JP) | G01J/3/45 |
| 07260617 | 10/1995 | (JP) | G01L/23/22 |
| 1-237430 | 9/1989 | (JP) | G01N/3/08 |

OTHER PUBLICATIONS

Kersey, "Distributed and Multiplexed Fiber Optic Sensors," in Udd, Ed., *Fiber OpticSensors: An Introduction for Engineers and Scientists*, (New York, 1991), pp. 347–363.

* cited by examiner

*Primary Examiner*—Frank G. Font
*Assistant Examiner*—Andrew H. Lee
(74) *Attorney, Agent, or Firm*—Klein & Szekeres, LLP

(57) ABSTRACT

A system for measuring changes in an environmental parameter, such as velocity or pressure, includes an optical signal source for providing a coherent light signal, and an interferometer having a first and second optical legs of unequal optical path lengths. The signal is split into first and second beams that are respectively directed into the first and second optical legs of the interferometer. A fixed mirror reflects the first beam received at the end of the first optical leg. An optical pick-off includes a movable mirror, positioned to reflect the second beam received from the end of the second optical leg. The movable mirror is movable in response to changes in the value of the parameter to be measured. An optical coupler combines the first and second beams after they have been reflected back into their respective optical legs, producing an interference signal, which is detected by an optical detector. The detector generates an electronic signal having a value indicative of the value of the interference signal. The electronic signal is analyzed to correlate its value to changes in the value of the environmental parameter to be measured.

8 Claims, 4 Drawing Sheets

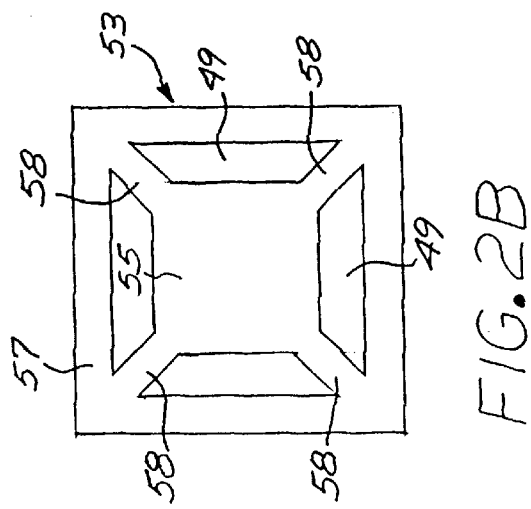
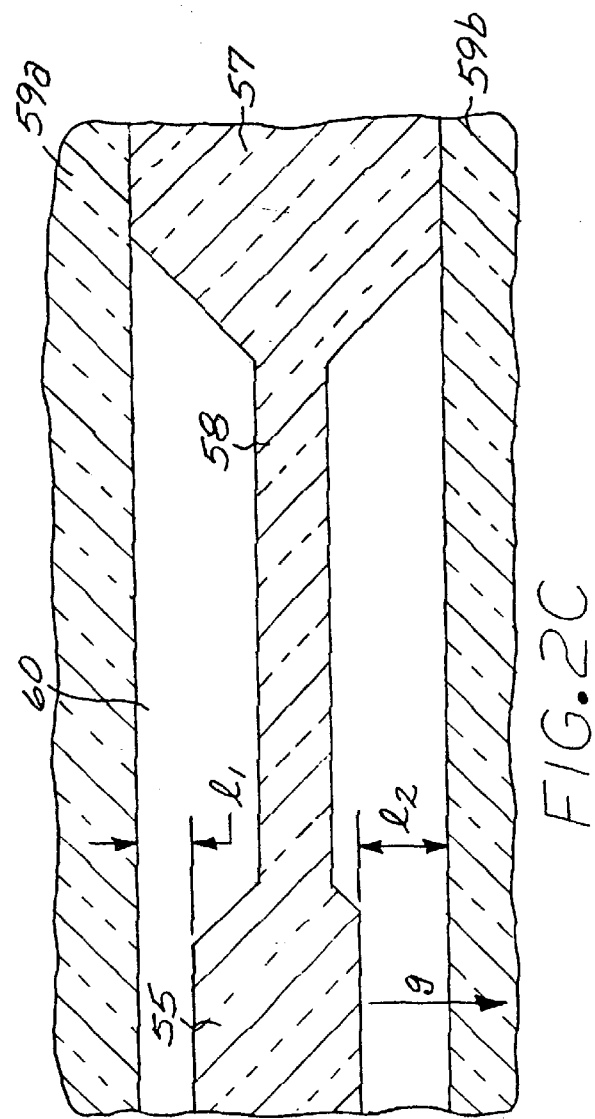

UNBALANCED FIBER OPTIC MICHELSON INTERFEROMETER AS AN OPTICAL PICK-OFF

CROSS-REFERENCE TO RELATED APPLICATIONS

This application is a Continuation-in-Part of application Ser. No. 08/848,090; filed Jun. 6, 1997, now Pat. No. 5,949,740 which is assigned to the same assignee as the present application.

FEDERALLY SPONSORED RESEARCH OR DEVELOPMENT

Not Applicable

BACKGROUND OF THE INVENTION

The present invention relates to optical sensors used to measure changes in environmental parameters such as pressure, displacement, acceleration, and velocity. More specifically, the invention is directed to an optical pick-off as part of an interferometer that can be used in such a sensor.

Michelson or Mach-Zehnder interferometers have been known for use in certain applications, such as acoustic sensors. A description of a Mach-Zehnder interferometer used in an underwater acoustic sensor is contained in, for example, U.S. Pat. No. 5,448,058 to Arab-Sadeghabadi et al.

An optical interferometer of known type includes a pair of optical fibers into which a single source of light directs a light signal. The light signals, guided respectively through the two fibers, follow optical paths of different lengths, producing a phase difference between the two signal beams when the beams are combined. The combined beams may be detected by an optical detector. If the two signal beams have the same polarization state when they are combined, the signals interfere to form a fringe pattern of bright and dark lines that is detected by the optical detector.

Exposing either or both of the fibers to a change in the environmental parameters, such as an acoustic pressure change, changes the fringe pattern that is incident on the optical detector. Such changes in the fringe pattern as detected by the optical detector may be analyzed to measure the changes in the environmental parameters to which the fiber has been exposed. In this manner, the nature of the acoustic waves to which the fiber is exposed may be determined when the interferometer is used in an acoustic sensor.

Mach-Zehnder or Michelson interferometers employed in underwater acoustic sensor ("hydrophone") systems use tens of meters of optical fiber wrapped on a mandrel. The fiber is stretched and/or contracted to produce a measured phase delay that is proportional to the changes in pressure resulting from acoustic waves. The interferometer has an optical path length mismatch between its two optical legs that is on the order of one meter, to allow the standard functioning and signal processing with a phase-generated carrier. See, for example, Kersey, "Distributed and Multiplexed Fiber Optic Sensors", in Udd, Ed., *Fiber Optic Sensors: An Introduction for Engineers and Scientists*, (New York, 1991), pp. 347–363.

Fiber optic interferometric sensor systems, of the types described above, have found favor over piezoelectric hydrophone systems, due to such advantages as immunity to electromagnetic interference (EMI); the ability to locate all electronic and electrical components and systems in the towing vessel, rather than in the underwater environment; and enhanced capabilities for measuring vector quantities. The prior art fiber optic sensor systems, however, are relatively expensive to manufacture. Thus, less expensive alternatives that provide the same advantages over piezoelectric systems have been sought. Batch-processed silicon chip sensors, having a proof mass that is moved in response to changes in environmental parameters, such as pressure and acceleration (which may result from, for example, vehicle or medium motion), have been employed as accelerometers and velocity sensors. Such silicon sensors are very inexpensive and quite rugged. Use of such silicon sensors in a hydrophone system, with the proof mass accessed by a fiber optic delivery system, would lower costs as compared with prior art fiber optic systems. Making such chip sensors compatible with existing fiber optic architectures in Mach-Zehnder and Michelson interferometric sensing systems and the like has, however, proved troublesome in practice.

It would therefore be a significant advancement in the state of the art to provide a fiber optic interferometric sensor system, in a hydrophone or like application, that is capable of employing common, batch-processed silicon sensors.

SUMMARY OF THE INVENTION

The present invention is a measuring system that uses an inexpensive silicon chip sensor in an optical interferometer to measure pressure, velocity, acceleration, or other environmental attributes or parameters. In a preferred embodiment, the sensor includes a movable proof mass that is used as a movable mirror at the end of one leg of an interferometer having two unequal length legs. The proof mass of the silicon chip sensor moves in response to a change in a particular environmental parameter, changing the optical length of the interferometer leg.

The present invention includes an optical signal source for providing a pulsed, coherent light signal, and an interferometer having first and second fiber optic legs of unequal optical path length. The signal is split into first and second beams that are respectively directed into the first and second fiber optic legs. A fixed end mirror is placed on the end of the first of the fiber optic legs for reflecting the first beam received at the end of the first fiber optic leg. An optical pick-off is fixed beyond the end of the second of the fiber optic legs. The optical pick-off comprises a proof mass that is movable relative to the end of the second fiber optic leg. The surface of the proof mass is reflective and positioned to reflect the second beam received from the end of the second fiber leg. An optical coupler combines the first and second beams reflected from the fixed end mirror and the proof mass, producing an interference signal. An optical detector optically coupled to the coupler detects the interference signal of the combined beams and generates an electronic signal having a value indicative of the value of the interference signal. The electronic signal is analyzed to correlate its value to changes in the value of the environmental parameter to be measured.

The measuring system of the present invention provides an accurate, relatively low-cost fiber optic interferometric sensor system, in a hydrophone or like application, that employs common, batch-processed silicon sensors, and that is completely compatible with existing fiber optic architectures of telemetric systems.

BRIEF DESCRIPTION OF THE DRAWINGS

FIG. 2B is a top plan view showing a preferred embodiment construction of the proof mass, supporting hinges, and frame of the silicon chip sensor of FIG. 2A;

FIG. 2C is an enlarged cross-sectional view showing an asymmetrical proof mass designed to compensate for gravity;

DETAILED DESCRIPTION OF THE INVENTION

The present invention will now be described in the context of its preferred embodiments.

Figure 1:
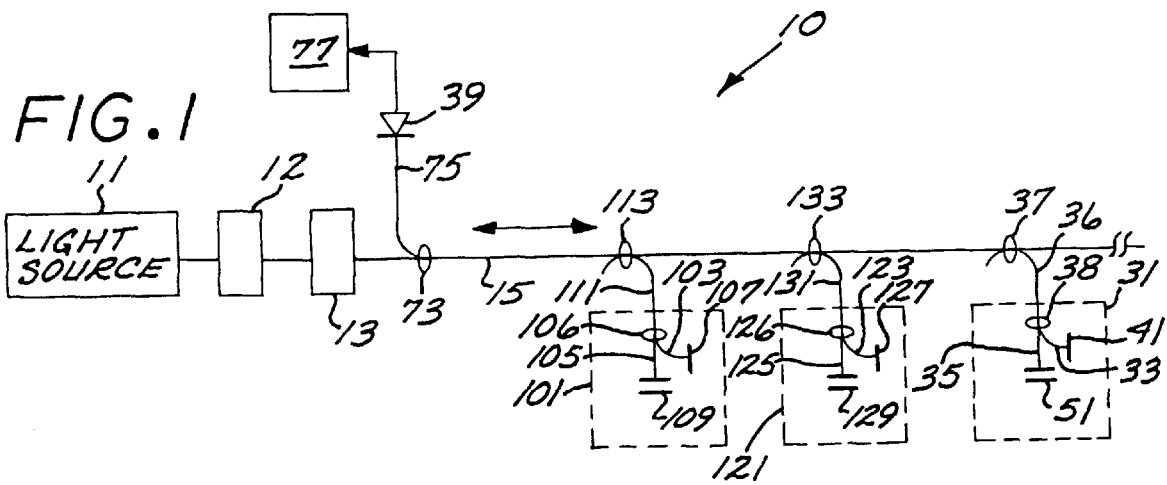
FIG. 1 is a schematic representation of a measuring device constructed according to a preferred embodiment of the invention, incorporating several interferometers.

A measuring system 10, constructed according to the present invention, is illustrated in FIG. 1. The measuring system 10 comprises one or more interferometers that measure changes in the interference patterns in light reflected from the ends of optical fiber paths having unequal lengths.

Specifically, the measuring system 10 includes a light source 11, which is preferably a laser producing an optical signal of coherent light in the infrared or visible spectrum. The light source 11 may be directly pulsed, or it may be energized continuously, with its signal being pulsed by a lithium niobate amplitude modulator 12, operated as an optical gate, or by an equivalent mechanism. The pulsed signal is then fiber-optically transmitted to a phase modulator 13, which creates a phase-generated carrier at a selected carrier frequency.

The pulsed and phase-modulated signal is propagated in a first direction through an optical fiber transmission line 15 to a single interferometer or a plurality of interferometers in series along the transmission line 15. In the illustrated embodiment, three interferometers 31, 101, 121 are shown, for purposes to be described below. For the purposes of the instant discussion, only the first interferometer 31 will be described.

The first interferometer 31, which is optically coupled to the transmission line 15 by a fiber optic down-link 36 and a first optical coupler 37, comprises a pair of unequal length optical fiber legs 33, 35. The optical signal propagating through the transmission line 15 in the first direction from the light source 11 is split into two interrogation beams by a second optical coupler 38. The second optical coupler 38, which may be a conventional 3 dB optical coupler, directs a first beam into the first leg 33, and a second beam into the second leg 35.

The optical path length of the second optical leg 35 is substantially greater than optical path length of the first leg 33. For example, the optical path length of the first leg 33 is as short as possible, preferably no more than about 10 centimeters in length. The optical path length of the second leg 35 may be as short as about one meter in length.

As will be explained in detail below, the first and second beams are reflected at the ends of the first and second optical fiber legs 33, 35, respectively, returning through the optical legs to the second optical coupler 38, which recombines the reflected light signals for return propagation along the transmission line 15 in a second (opposite) direction to a photodetector 39. Changes in the relative optical path lengths between the two legs cause changes in the interference patterns in the reflected light when it returns to the transmission line 15. As will be described below, and recognized by those skilled in the art, the analysis of that interference pattern, and of the changes to it, permits changes in the environmental parameters to which the interferometer 31 is exposed (such as pressure and motion) to be determined.

The first optical fiber leg 33 (the shorter leg) has a normal high reflectivity end mirror 41 fixed at its remote, or second, end. This fixed end mirror 41 reflects the first beam propagated through the first leg 33 back into the first leg in the second direction, toward the light source 11 (and toward the detector 39). The fixed end mirror may optionally be located on an immobile housing or frame (not shown).

At the remote, or second, end of the second fiber leg 35, an optical pick-off 51 (of the type described in detail below) includes a silicon chip sensor containing a movable proof mass. The proof mass provides a movable end mirror that reflects the second beam propagated through the second leg 35 back into the second leg in the second direction, toward the light source 11 and the detector 39.

The system shown in FIG. 1 is a time division multiplexing (TDM) system. Those skilled in the pertinent arts will recognize that the present invention may be employed in a frequency division multiplexing (FDM) system, and the modifications of the system shown in FIG. 1 needed to employ the invention in an FDM system would be within the skill of such practitioners.

Figure 2A:
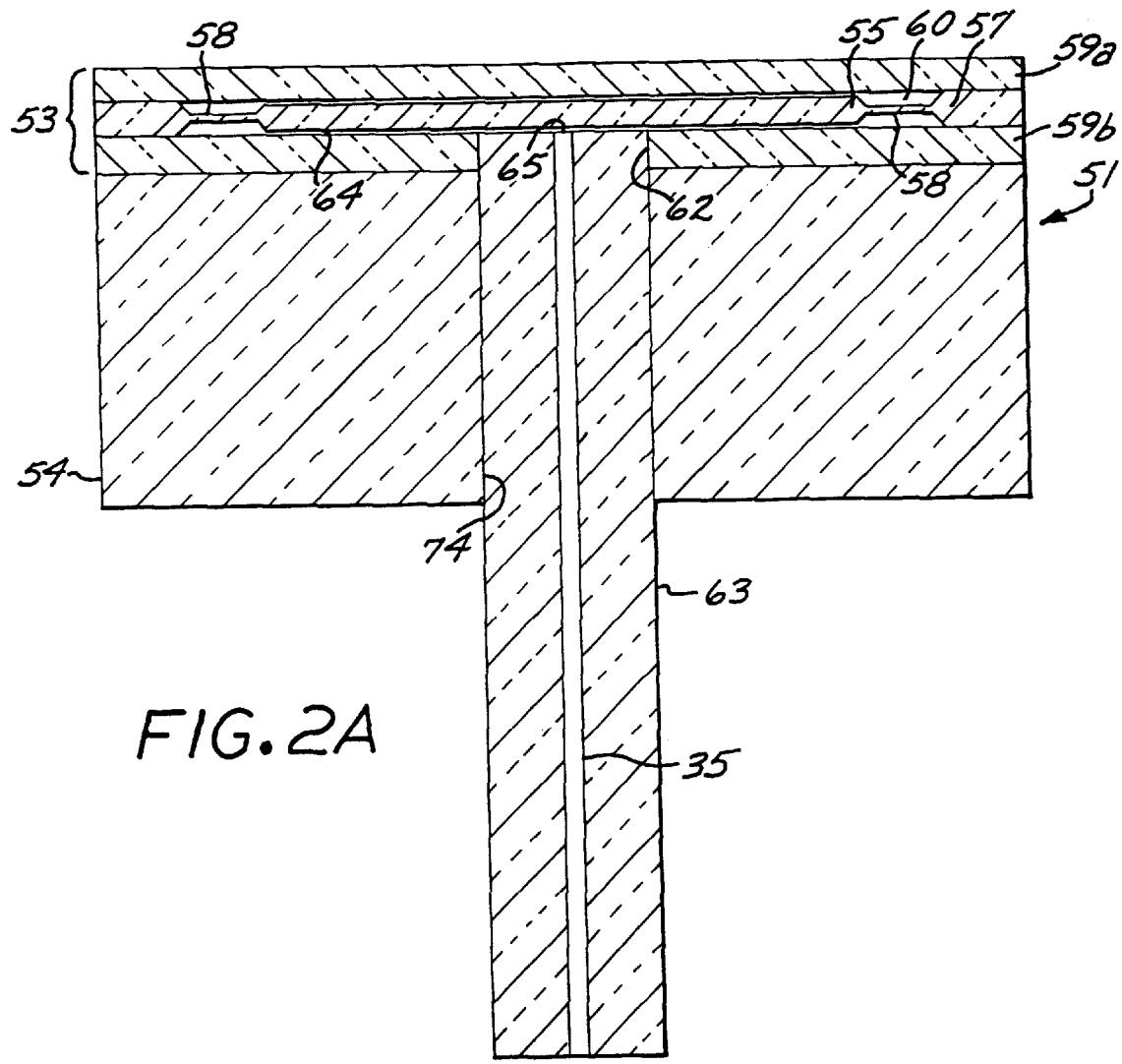
FIG. 2A is a cross sectional view of an exemplary embodiment of a silicon chip sensor, of the type that may be employed as a velocity sensor, and one embodiment of a support block for holding the chip sensor and the end portion of the optical fiber in an optical pick-off constructed according to the invention.

FIG. 2A is a cross-sectional view of a preferred embodiment of a single silicon chip sensor 53 that includes a movable proof mass 55. FIG. 2B shows the general preferred configuration of a 9 mm by 9 mm proof mass 55 supported at the corners by hinges 58 attached to a frame or peripheral mounting portion 57. Each hinge 58 has a width of approximately 500 microns. A peripheral mounting portion 57 has a length and width of approximately 12.5 mm by 12.5 mm. The proof mass 55 is separated from the peripheral mounting portion 57 by a gap 49 of approximately 100 microns. The shapes and sizes of the proof mass 55, the gap 49, and the peripheral mounting portion 57 are exemplary, as are the number and attachment sites for the hinges 58. Such a configuration is needed to prevent the proof mass 55 from distorting or undergoing a cantilevered motion, which would cause the optical signal reflected off the surface of the proof mass 55 to stray off the mark. The present invention sensor 53 operates with the proof mass 55 suspended in a fluid such as, for example, nitrogen or ambient air.

Referring now to FIGS. 2A and 2B, the optical pick-off 51 incorporates a silicon chip sensor 53 mounted on a pick-off support block 54. Silicon chip sensors suitable for the present invention are widely known and readily available. They are relatively inexpensive, and may be manufactured in large quantities. Silicon chip sensors use a movable proof mass to sense dynamic changes in the environment, such as velocity, acceleration, or changes in pressure.

An exemplary silicon chip sensor 53, as shown in FIG. 2A, includes an integral silicon element comprising a movable proof mass 55 attached to a peripheral mounting portion 57 by means of flexible connecting portions or hinges 58 along at least two opposed edges of the proof mass. The mounting portion 57 is securely fixed between a first housing portion 59a and a second housing portion 59b, which define between them an internal housing cavity 60 that contains the proof mass 55. The housing portions 59a, 59b advantageously comprise plates of a ceramic material having a low coefficient of thermal expansion, preferably Pyrex® glass (marketed by Corning Glass, Corning, N.Y.), or an equivalent material. The proof mass 55 must be able to move within the cavity 60 in response to changes in environmental parameters, as will be described below. The second housing portion 59b includes an opening 62, approximately aligned with the center of the proof mass 55, through which the second optical beam is directed to the proof mass 55, as will be described below.

As mentioned above, the hinges 58 are preferably located at opposite edges of the proof mass 55, thereby suspending the proof mass 55 at opposite ends. Suspending the proof mass 55 at its opposite ends ensures that it does not tilt relative to the incoming second optical beam in a cantilevered fashion. Such tilting would skew the second optical beam that is reflected off of the movable end mirror provided by the proof mass, so that the signal for the second optical leg 35 is lost.

To compensate for the effect of gravity on the proof mass 55, the present invention in a preferred embodiment incorporates asymmetry into the profile of the proof mass 55. This is best seen in the enlarged detailed view of FIG. 2C, showing a portion of the proof mass 55 supported by a hinge 58 on the frame or peripheral mounting portion 57. The effect of gravity on the proof mass 55 is represented by downward arrow g. To compensate for gravity, the proof mass 55 has an asymmetry on either side of the hinge 58, resulting in unequal distances $l_1$ and $l_2$. Prior to the effect of gravity, as depicted in FIG. 2C, $l_1$ is less than $l_2$ so that with the effect of gravity, the proof mass 55 shifts downward so that $l_1$ is equal to $l_2$. Gravity must be considered because the present invention is small.

The remote end portion of the second optical fiber leg 35 may be contained in a ferrule 63, which is preferably a ceramic tube. An axial passage through the ferrule 63 holds the remote end portion of the second optical fiber leg 35, and is essentially the same diameter as the diameter of the optical fiber 35. The remote end of the ferrule 63, with the remote end portion of the second optical fiber leg 35 contained therein, is inserted into the opening 62 in the second housing portion 59b of the silicon sensor 53. A movable end mirror is provided by the proof mass 55 in the form of a highly reflective surface 64 that is spaced from and opposed to an end surface 65 of the second optical fiber leg 35 that lies substantially flush with the end surface of the ferrule 63 within the opening 62. Preferably, this reflective surface 64 is provided by a thin metallic coating, such as gold, to provide a reflectivity close to 100%. Thus the light beam from the fiber 35 passes through air only as it exits the end face 65 of the fiber, is reflected by the surface 64 of the proof mass, and returns to the fiber. The light does not travel through other materials that may distort the beam.

The gap between the end surface 65 of the fiber 35 and the reflective surface 64 of the proof mass 55 should be sufficiently small that there is minimal optical loss from beam spreading as the light exits the end of the fiber and is reflected back into the fiber. Preferably, the gap width is equal to at most a few wavelengths of the light propagating through the fiber. For example, for wavelengths of interest, the gap width would preferably be between about 25 microns and about 20 microns, so that the "round trip" distance the light travels in air is in the range of about 5 to about 40 microns. The end surface 65 of the second fiber leg 35 is coated with an anti-reflective coating (not shown) to minimize unwanted etalon reflections between the proof mass 55 and the fiber end surface 65, and to ensure that all of the reflected signal enters the fiber. The anti-reflective coating on the end surface 65, which also substantially eliminates retroreflection back into the second optical fiber leg 35, should have a reflectivity that is preferably no more than about 0.1%. The fabrication of optical coatings with such a low degree of reflectivity is known in the art, as shown, for example, in U.S. Pat. No. 5,529,671 to Debley et al., the disclosure of which is incorporated herein by reference.

The sensor 53 is mounted on the support block 54 so that the opening 62 in the second housing portion 59b coincides with an axial bore 74 in the support block 54 that receives the ferrule 63. The sensor 53 is bonded to the support block 54 by an epoxy adhesive, preferably one that is ultraviolet-cured. The remaining length of the second fiber leg 35 outside the ferrule 63 may be contained within a typical fiber jacket (not shown), as is well known in the art. The pick-off support block 54 may be annular, although the specific configuration and dimensions are matters of design choice to suit the particular application of concern.

Thus, the second optical beam passing through the second optical fiber leg 35 emerges from the end surface 65 of the fiber, and passes through the air gap between the fiber end surface 65 and the reflective surface 64 of the moving proof mass 55. The reflective surface 64 reflects the light beam back into the second optical fiber leg 35.

The optical pick-off using a silicon sensor can be used to measure velocity, displacement, or acceleration, or changes in pressure. As is known to those skilled in the art, acceleration is detected when the proof mass 55 of the sensor 53 moves within the cavity 60, and thus relative to the housing portions 59a, 59b. Because the housing portions 59a, 59b are fixed with respect to the second optical leg 35, movement of the proof mass 55 within the cavity 60 also is movement with respect to the second optical leg 35. Such movement changes the width of the optical gap between the reflective surface 64 of the proof mass 55 and the end surface 65 of the second optical leg 35. The inner surface of the first housing portion 59a is spaced a small distance from the proof mass 55, to permit the proof mass 55 to move in a single axis within the cavity 60. The entire structure may be contained in a neutrally buoyant housing (not shown).

Figure 3:
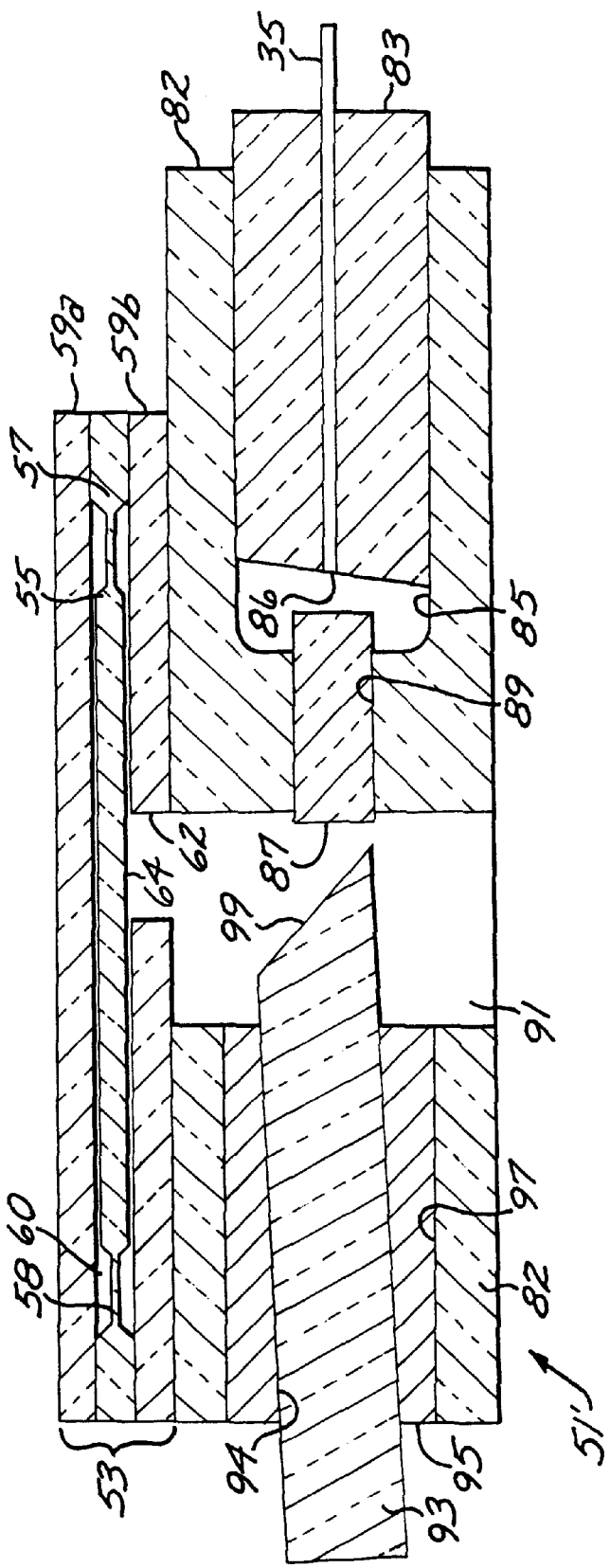
FIG. 3 is a cross-sectional view of the silicon chip sensor of FIGS. 2A and 2B and a second embodiment of a support block for holding the sensor and the end portion of the optical fiber in an optical pick-off constructed according to the invention.

Referring to FIG. 3, a modified pick-off 51' having an alternate pick-off support block 82 is shown for use in applications in which a substantially flat structure for the pick-off 51' is necessary or desired. The pick-off support block 82 receives the remote end of the second optical leg 35 and provides an optical path for the second optical beam between the end of the second optical leg 35 and the proof mass 55 of the silicon sensor 53. The pick-off support block 82 is preferably formed of a disc-shaped piece of ceramic material, or a material of substantially equivalent thermal stability (i.e., low coefficient of thermal expansion), although its configuration and dimensions are largely matters of design choice, depending on the application.

The remote end portion of the second optical leg 35 is contained in a ferrule 83, which, like the support block 82, should be formed of a material that has a negligible thermal coefficient of expansion, such as a suitable ceramic. The ferrule 83 is inserted into a first lateral bore 85 in the support block 82, with sufficient clearance to allow the ferrule 83 to be axially rotatable within the bore 85 so that the orientation of the light beam may be adjusted for optimal operation, as will be described below. Furthermore, as will be seen, the ferrule 83 is also preferably installed in the bore 85 so as to be axially movable therein. An axial passage through the ferrule 83 holds the remote end portion of the second optical fiber leg 35. The second optical fiber leg 35 has an end face 86 that is preferably angled about eight degrees substantially to eliminate retro-reflection back into the second optical fiber leg 35, without the need for an anti-reflective coating. For ease of manufacture, the end face of the ferrule 83 is similarly angled so as to be substantially flush with the second fiber leg end face 86.

A cylindrical graded index lens (GRIN lens) 87 is optically aligned with the end of the second fiber leg 35 to focus a light beam emerging from the second optical leg 35 onto the reflective surface 64 of the proof mass 55. There is preferably a gap of approximately 0.2 mm between the end face 86 of the second optical fiber leg 35 and the facing optical surface of the GRIN lens 87.- The GRIN lens 87 is contained in a second lateral bore 89 in the support block 82 that is coaxial with the first lateral bore 85.

The sensor 53 is bonded to the surface of the support block 82 so that the optical opening 62 in the second sensor housing portion 59b is aligned with an air-filled optical passage 91 formed axially through the support block 82. To accommodate the ferrule 83, the GRIN lens 87, and the components to be described below, the passage 91 is not necessarily centered in the block 82.

A mirror rod 93 is installed in an eccentric bore 94 in a tubular fitting 95 which, in turn, is installed for axial rotation in a third lateral bore 97 in the support block 82. The inner end of the mirror rod 93 terminates in a mirrored surface 99, cut at a 45° angle, that protrudes into the passage 91 so as to receive a light beam emerging from the GRIN lens 87. The second optical beam emerging from the end of the second optical fiber leg 35 propagates through the GRIN lens 87, is then reflected at a 90 degree angle by the mirrored surface 99 on the end of the mirror rod 93, and then propagates through the passage 91. The tubular fitting 95 is rotatable within the third lateral bore 97 so that the impingement point of the light beam on the mirrored surface 99 may be adjusted for optimal operation, i.e., to minimize losses and unwanted reflections. An additional degree of adjustability may be obtained by installing the mirror rod 93 in the tubular fitting 95 so as to be axially rotatable within the eccentric bore 94. Additional alignment adjustments can be effected by changing the distance between the end of the second optical fiber leg 35 and the GRIN lens 87. For example, a coarse adjustment can be effected by moving the ferrule 83 axially within the bore 85, and, due to the angled end surface 86 of the second optical fiber leg 35, a fine adjustment can be effected by rotating the ferrule 83.

The optical opening 62 in the second sensor housing portion 59b is aligned so that the light path does not pass through the housing material. Since the opening 62 registers with the passage 91 in the pick-off support block 82, the second optical beam propagates only through air once it exits the GRIN lens 87. Thus, the second optical beam propagating through the second optical fiber leg 35 emerges from the end 86 of the fiber, passes through the air gap between the fiber end 86 and the GRIN lens 87, and enters the GRIN lens 87. The GRIN lens 87 images the light beam from the fiber end 86 onto the reflective surface 64 of the proof mass 55. The mirrored surface 99 reflects the beam ninety degrees, causing the light beam to pass through the opening 62 in the second housing portion 59b of the sensor 53, so as to impinge on the reflective surface 64 of the proof mass 55. The reflective surface 64 reflects the light beam back toward the mirrored surface 99. The mirrored surface 99 reflects the reflected beam ninety degrees back into the GRIN lens 87. The reflected beam then passes through the GRIN lens 87 and re-enters the second optical fiber leg 35. Efficient coupling of the light beam from the fiber 35 to the proof mass surface 64 and back is important to obtain maximum effectiveness of the device. There should be minimal back reflections at the fiber end 86 or elsewhere.

The mirrored surface 99 should be adjusted so that the reflected light from the reflective surface 64 propagates exactly along the same path as the beam impinging on the reflective surface 64. Thus, the mirrored surface 99 should direct the beam as close to the center of the proof mass 55 as possible if the proof mass 55 flexes at all during use.

Figure 4:
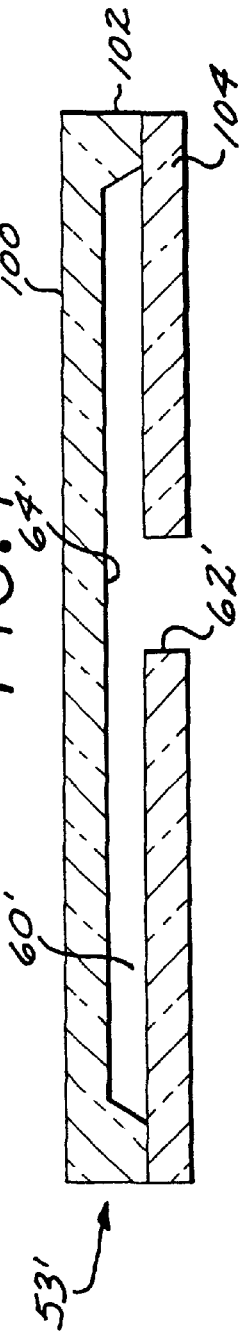
FIG. 4 is a cross-sectional view of an alternative embodiment of a silicon chip sensor that may be used in the present invention.

For applications in which changes in the environmental pressure are to be measured (such as a hydrophone system), the structure of the sensor may differ from that shown in FIGS. 2A, 2B, 2C, and 3. As will be understood by those skilled in the art, in such an application the 1 proof mass structure 55, 58 shown in the drawings would be omitted. The structure of such an alternative sensor 53' is shown in FIG. 4. The sensor 53', which may be used with either the support block 54 of FIG. 2A or the support block 82 of FIG. 3, includes a silicon s diaphragm 100 instead of a proof mass. The diaphragm 100 has a peripheral rim 102 surrounding a flexible central area that flexes in response to changes in environmental pressure. The peripheral rim 102 is attached to a rigid base plate 104, forming an internal optical cavity 60' between the diaphragm 100 and the base plate 104. The base plate 104 has an optical opening 62' for the passage of the second optical beam, which strikes a reflective surface 64' that is applied directly to the interior surface (which faces the cavity 60') of the diaphragm 100. Pressure changes cause the central area of the diaphragm 100 to move, changing the path length of the optical gap defined by the width of the internal cavity 60'.

Figure 5:
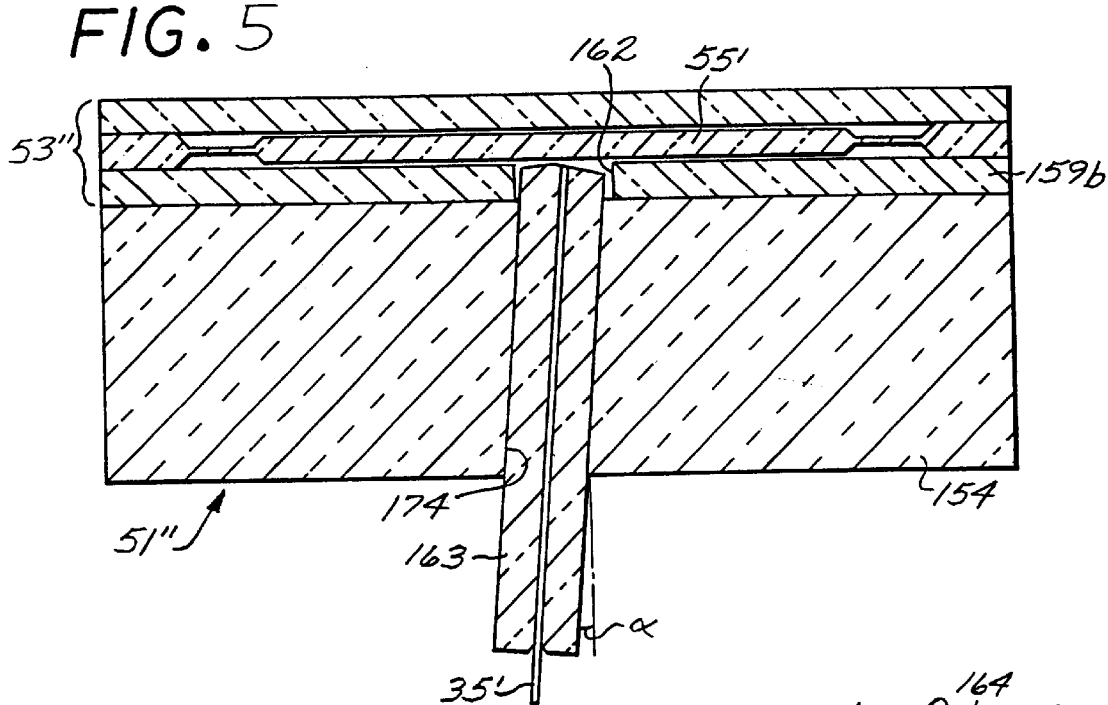
FIG. 5 is a cross-sectional view of the silicon chip sensor of FIG. 2 and a modified form of the first embodiment of the support block adapted for holding an optical fiber having an angled end face.
Figure 6:
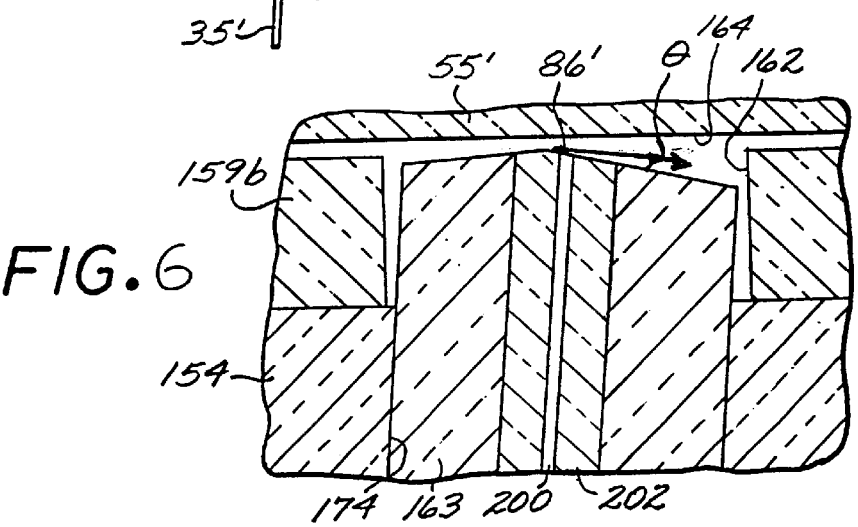
FIG. 6 is an enlarged, detailed view of the angled end face of the optical fiber and the ferrule of FIG. 5.

An advantage of the pick-off 51 of FIG. 2A is that active optical alignment or adjustment, if desired, may be effected simply by permitting movement of the ferrule 63 axially in the bore 74. The disadvantage is the need for an anti-reflective coating on the end face 65 of the second optical fiber leg 35. Conversely, the pick-off 51' of FIG. 3 eliminates the need for an anti-reflective coating, but active optical alignment requires adjustment of both the ferrule 83 and the mirror rod 93. It would be advantageous to provide a pick-off in which the active optical alignment is simple, and that does not require an anti-reflective coating on the end face of the second optical fiber leg 35. FIGS. 5 and 6 illustrate a modification of the first embodiment of the support block that accomplishes this result.

In FIGS. 5 and 6, a pick-off 51" includes a support block 154 that is adapted to hold a second optical fiber leg 35' with an angled end surface 86'. A silicon chip sensor 53", which may be similar to the sensor 53 described above and illustrated in FIGS. 2A and 3, is bonded to the support block 154. (Alternatively, a sensor similar to the sensor 53' of FIG. 4 may be used with the support block 154.) The chip sensor 53" has a proof mass 55' with a highly-reflective mirrored surface 164, as described above. The support block 154 differs from the support block 54 described above and illustrated in FIG. 2A in that the former has a bore 174 that is offset from the normal to the plane of the mirrored surface 164 by an angle α. In a preferred embodiment, the value of α is approximately 3.7°, although it may range from about 3.4° to about 4.0°. The bore 174 receives a ferrule 163 that contains the remote end portion of the second optical fiber leg 35'. The bore 174 communicates with an opening 162 in a second housing portion 159b' of the sensor 53". The diameter of the opening 162 accommodates the entry therein of the remote end of the ferrule 163 at the angle α. Thus, the axis of the remote end portion of the second optical fiber leg 35' is oriented at the angle α with respect to the normal to the plane of the mirrored surface 164. Referring to FIG. 6, the second optical fiber leg 35' comprises a core 200 surrounded by a coaxial cladding 202, as is typical of conventional optical fibers. As mentioned above, the optical fiber 35' has an end face 86' that is cut at an angle. This angle, labeled θ in FIG. 6, is defined as the angle between the end face 86' and an imaginary line that is perpendicular to the axis of the fiber 35'. The value of θ preferably lies in the range of approximately 8° to approximately 15°, depending on the degree of reduction in retro-reflection desired and the type of optical fiber employed. Since the core 200 is centered in the cladding 202, and since it is necessary to make the face of the core 200 continuously planar, the angled end face 86' must be cut so that the vertex of the angle is in the cladding 202 on one side of the core 200. The end face 86' is preferably cut so that the angle θ is defined on both sides of the vertex. For ease of manufacture, the remote end of the ferrule 163 is cut at the angle θ so that the perimeter of the end face 86' of the optical fiber 35' is flush with the remote end surface of the ferrule 163. Because the axis of the ferrule 163 (and therefore the axis of the optical fiber 35') is offset at the angle α from the vertical (as oriented in the drawings), the half of the end surface 86' of the optical fiber 35' that includes the core 200 is offset from the horizontal by an angle having a value of θ+α, while the other half of the optical fiber end surface 86' is offset from the horizontal by an angle having a value of θ−α.

The angled configuration of the end surface 86' of the optical fiber 35' substantially eliminates retro-reflection back into the optical fiber of the optical beam emerging therefrom, while also minimizing unwanted etalon reflections between the mirrored surface 164 of the sensor 53" and the end face 86' of the optical fiber 35'. The ferrule offset angle α compensates for the refraction, in accordance with Snell's Law, of the optical beam emerging from the optical fiber 35'Thus, the ferrule offset angle α is selected so that the refraction of the optical beam at the fiber/air interface (i.e., the fiber end surface 86') results in an optical beam that impinges on the mirrored surface 164 substantially normal to the surface thereof, so that it is precisely reflected back into the optical fiber 35'.

Active optical alignment of the pick-off 51" described above can be easily and simply accomplished by adjusting the distance between the mirrored surface 164' and the end face 86' of the optical fiber 35'. This adjustment may be made, for example, by moving the ferrule 163 longitudinally in the bore 174.

In a sensor system constructed in accordance with a preferred embodiment of the invention, the first and second optical beams are recombined and processed as follows: Referring again to FIG. 1, the second optical beam reflected from the pick-off 51 (which may be any of the embodiments described above) is propagated back in a second direction through the second optical fiber leg 35, while the first optical beam, reflected from the fixed mirror 41, is propagated back in a second direction through the first optical fiber leg 33.

The first and second optical beams are recombined in the second optical coupler 38 so as to form an interference signal that changes with the motion of the movable mirror of the pick-off 51 in response to changes in the value of the environmental parameter. The interference signal is propagated through the down-link 36 and coupled to the transmission line 15 by the first optical coupler 37. The interference signal is propagated through the transmission line 15 and is transmitted to the photodetector 39 by means of an optical fiber link 75 coupled to the transmission line by an optical coupler 73.

Because the second optical beam reflected from the pick-off 51 has traveled a different path length than has the first optical beam reflected from the end mirror 41, the light reflected from the pick-off 51 interferes with the light reflected from the end mirror 41, creating an interference pattern that changes as the proof mass 55 moves in response to the changes in the environmental parameter. The interference pattern changes manifest themselves in changes in the value of the interference signal detected by the photodetector 39, which generates an electrical output signal having a value that indicates the changes in the interference signal value. This electrical output signal is input to a microcomputer 77 (after suitable and conventional signal conditioning and digitizing) that processes the electrical signal, by means well known in the art, to correlate changes in the value of the interference signal with changes in the value of the environmental parameter, thereby yielding measurements indicative of changes in the value of the parameter.

In use of the invention as an accelerometer, movement of the body to which the optical pick-off 51 is attached causes the proof mass 55 contained in the housing 59a, 59b to move within the sensor cavity 60. That movement of the proof mass 55 changes the length of the optical path for the light propagating through the second leg 35. Thus, changing the length of the optical path changes the interference pattern in the reflected interference signal that is detected by the photodetector 39. From such changes in the interference pattern in the reflected light, the movement of the proof mass 55 can be determined.

The invention may also be used as a pressure sensor, as in a hydrophone, preferably employing the sensor 53' shown in FIG. 4. Changes in pressure (such as sound waves passing over the pick-off 51) cause the flexible diaphragm 100 to flex, changing the length of the optical path for the light propagating through the second leg 35. Thus, changing the length of the optical path changes the interference pattern in the reflected interference signal that is detected by the photodetector 39. From such changes in the interference pattern in the reflected light, environmental pressure changes can be measured. From such measured pressure changes, information about sound waves causing those changes can be obtained.

Unlike the prior art, the optical fiber components in the present invention do not perform a sensor function. Sensing is performed through the silicon sensor 53 of the pick-off 51. For sensing environmental changes having a frequency above a few tenths of one Hertz, phase delays in the optical fiber legs 33, 35 due to fiber stretching are negligible.

A phase generated carrier necessary for the described system requires a sufficient optical path length mismatch between the two fiber legs 33, 35. Current state of the art with respect to passive fiber optic sensor architectures dictates an optical path length mismatch between the first and second fiber legs 33, 35 that should be about 10 cm to about 1 meter. Such an optical path length mismatch is also compatible with current, state-of-the-art, stable, narrow line width laser sources and fiber optic architectures using internal frequency modulation and time division multiplexing or external phase modulation and frequency division multiplexing.

The optical pick-off 51 measures the displacement of the proof mass 55 with respect to the fixed silicon sensor housing 59a, 59b at frequencies above some minimum around one to five Hertz. While the optical path lengths within the fiber legs 33, 35 may slowly drift over time and temperature, such changes cause errors so low in frequency that they can be ignored for the purposes of making measurements with the requisite degree of accuracy. For example, a one degree Celsius change in temperature in one minute may produce fringe motion corresponding to 0.1 Hz, far below the above-mentioned minimum, when the difference in length between the two fiber legs 33, 35 is approximately one meter.

For use as an accelerometer, the proof mass 55 of a given optical pick-off 51 has a response in one direction only. Three interferometric sensors, each containing its own silicon chip sensor, may be used to measure motion in the three axes x, y, and z. A triad of such sensors may be mounted on one block.

FIG. 1 shows an exemplary embodiment of a system incorporating three sensors, such as might be used for measuring velocity or acceleration in three directions. The second and third interferometers 101, 121 used as accelerometers are substantially identical to the first interferometer 31, although they may be any of the embodiments of FIGS. 2A, 3, or 5. It is not necessary for all the interferometers in a particular system to be of the same embodiment, nor is the system limited to any particular number of interferometers.

In FIG. 1, the second interferometer 101 contains unequal length fiber legs 103, 105. One fiber leg 103 is substantially shorter than the other fiber leg 105, the two legs being optically coupled by an optical coupler 106. The shorter leg 103 terminates in a fixed end mirror 107. The longer leg 105 terminates in an optical pick-off 109 that is advantageously substantially identical to any of the optical pick-offs 51, 51', or 51" described above. The second interferometer 101 is coupled to the transmission line 15 by a fiber optic down-link 111 and an optical coupler 113. Similarly, the third interferometer 121 contains unequal length fiber legs 123, 125, joined by an optical coupler 126. The first fiber leg 123 is substantially shorter than the second fiber leg 125. The shorter leg 125 terminates in a fixed end mirror 127. The longer leg 125 terminates in an optical pick-off 129. The third interferometer 121 is optically coupled to the transmission line 15 by a fiber optic down-link 131 and an optical coupler 133. Additional interferometers of the same construction may be added to the system by optically coupling them to the main transmission line 15.

For use in a hydrophone, a large number of interferometers (employing sensors 53', as shown in FIG. 4) may be arranged in an array to be towed behind a vessel. With sufficient laser source power, dozens of these devices can be driven by one laser. With distributed gain from erbium doping in selected portions of the optical fiber, hundreds of these interferometers can be driven by one optical pump and one signal laser.

As described above, the present invention can be applied in a displacement sensor, a velocity sensor, or an accelerometer. A proper selection of proof mass dimensions, gaps between the proof mass and the surrounding substrate, mass of the proof mass, the natural frequency of the suspension system, and fluid viscosity filling the gaps would yield the sensor of choice.

For seismic measurements, and assuming all other factors being equal, a displacement sensor has good performance bandwidth, better than a velocity sensor, but requires a large gap and highly viscous fluids for damping. The sensor must be large and bulky. An accelerometer has a very narrow usable bandwidth. A velocity sensor has better bandwidth than an accelerometer, with smaller gaps than in a displacement sensor, and operates in air. Therefore, a velocity sensor would appear to be more versatile than an accelerometer or a displacement sensor for seismic applications.

Empirical studies have shown that for measuring displacement, velocity, or acceleration, the mass and proportions of the proof mass influence the signal-to-noise ratio of the output signal of the sensor. For example, in a seismic sensing system incorporating ten or more interferometers on a transmission line similar to that shown in FIG. 1, it is preferable to have the output signal to be great enough in magnitude to be discernible over optical and electrical noise, and yet still operate within a useful frequency range of about 10 Hz to 500 Hz, for example.

Moreover, empirical studies indicate that to measure displacement, the sensor should have a proof mass of about 1 to 3 grams, with a square configuration of about 14 mm on each side. For velocity measurements, a proof mass of about 0.5 to 2 grams, and an area of about 12 mm ×12 mm is preferred. To measure acceleration, it is preferable to have a proof mass of about 0.05 to 0.25 grams and an area of about 6 mm ×6 mm. Proof masses of these sizes and proportions, with a surrounding frame or support, can be constructed from a flat silicon wafer of about 400–500 microns in thickness, for example, which is then etched by laser, gas, photolithography, or other techniques that are well-known in the art.

The interferometric system of the present invention can be adapted for the use of silicon chip sensors that are even smaller in size than those described above. An example of such a silicon microstructure chip sensor is disclosed in U.S. Pat. No. 5, 503,285 -Warren, the disclosure of which is incorporated herein by reference.

In addition, in the preferred embodiment, the proof mass in a velocity or acceleration sensor should be suspended in a gaseous medium, such as air or nitrogen, having a viscosity of about 0.00018 dyne-sec/cm$^2$. In a displacement sensor, the proof mass is preferably suspended in oil having a viscosity of about 0.16 dyne-sec/cm$^2$.

The present invention velocity sensor is constructed based on an approach of selecting the appropriate proof mass, damping fluid, etc., to diminish the acceleration and displacement components. To see this, a starting point is with the standard expression for the motion of a proof mass in an open loop system:

$$M\ddot{x}+C(f)\dot{x}+K(f)x=-M\dot{v}+T$$

where:

x=displacement of the proof mass relative to the mass housing $\dot{x}$=velocity of the proof mass $\ddot{x}$=acceleration of the proof mass M=mass of the proof mass C(f)=damping factor of the system K(f)=spring constant
v=housing velocity T is the applied force required to hold the proof mass at null; in other words, it is the force needed to rebalance the proof mass. In an open loop system, T equals zero.

The mass M and spring constant K are selected so that the damping factor C is much greater than the square root of the product of K and M. Thus, the acceleration and displacement terms may be ignored in the equation. Then dividing through the equation by C leaves:

velocity $\dot{x} \approx -(M/C)\ddot{v}$ or $x \approx -(M/C)v$ assuming $C >> (KM)^{1/2}$ where $K \neq 0$ and $M \neq 0$.

Hence, an open loop velocity sensor for seismic applications can be constructed using the above formula. An exemplary embodiment velocity sensor could be constructed based on the following ranges in the band of interest:

The mass is 0.050<M<0.250 gm.
The spring rate is 100,000<K<5,000,000 dyne/cm.
The damping factor is 10,000<C<60,000 dyne/(cm/sec).

The foregoing velocity sensor can be adapted for use with the optical pick-off described above. It is also contemplated that the present invention velocity sensor can be adapted for use with an electrostatic pick-off.

Although several preferred embodiments have been described herein, such embodiments are exemplary only. A number of variations and modifications may suggest themselves to those skilled in the pertinent arts. For example, the configuration and dimensions of the support blocks 54 (FIG. 2A), 82 (FIG. 3), and 54' (FIG. 5) may be varied to suit different applications. Also, the above-described alignment adjustment mechanism for the mirror rod 93 in the FIG. 3 embodiment may be modified to be adjustable in additional directions, or it may be omitted altogether. These and other variations and modifications are considered within the spirit and scope of the invention, as defined in the claims that follow.

What is claimed is:

1. A system for sensing changes in the value of an environmental parameter, comprising:
   an optical signal source;
   an interferometer optically coupled to the light source so as to receive an optical signal therefrom, the interferometer comprising:
     means for splitting the optical signal into first and second beams;
     first and second optical fibers respectively providing first and second optical paths for the first and second beams, respectively, the optical path length through the second optical path being substantially longer than the optical path length through the first optical path, the second optical fiber having a distal end;
     a fixed mirror terminating the first optical path so as to reflect the first beam back into the first optical fiber;
     a sensor having a proof mass that is movable in response to a change in the value of the parameter;
     a reflective surface on the proof mass that forms a movable mirror spaced from the distal end of the second optical fiber and terminating the second optical path so as to reflect the second beam back into the distal end of the second optical fiber, the movable mirror being movable relative to the distal end of the second fiber in response to a change in the value of the parameter; and
     optical coupling means for recombining the first and second beams after their reflection back along the respective optical fibers by the fixed and movable mirrors, respectively, so as to form an interference signal;
   optical detector means, responsive to the interference signals for generating an electrical signal indicative of the value of the interference signal; and
   means, responsive to the electrical signal, for correlating a change in the value of the interference signal with a change in the value of the parameter.

2. The system of claim 1, wherein the optical path length of the first optical fiber is no more than about 10 centimeters in length, and wherein the optical path length of the second optical fiber is at least approximately 1 meter in length.

3. The system of claim 1, wherein the sensor comprises first and second housing portions defining a cavity in which the proof mass is supported for movement, the second housing portion having an optical opening for the passage of the second beam for reflection from the reflective surface.

4. The system of claim 3, wherein the second optical fiber enters the optical opening at an angle $\alpha$ with respect to the normal to the plane of the sensor.

5. The system of claim 4, wherein the angle $\alpha$ is between about 3.4° and about 4.0°.

6. The system of claim 4, wherein the second optical fiber enters the optical opening and terminates in an end face that is configured with an angle $\theta$, wherein $\theta$ is defined as the angle between the end face and an imaginary line that is perpendicular to the axis of the fiber, and wherein the angle $\theta$ is between about 8° and about 15°.

7. A system for sensing changes in the value of an environmental parameter, comprising:
   an optical signal source;
   an interferometer optically coupled to the light source so as to receive an optical signal therefrom, the interferometer comprising:
     means for splitting the optical signal into first and second beams;
     first and second optical fibers respectively providing first and second optical paths for the first and second beams, respectively, the optical path length through the second optical path being substantially longer than the optical path length through the first optical path, the second optical fiber having a distal end;
     a fixed mirror terminating the first optical path so as to reflect the first beam back into the first optical fiber;
     a sensor having a flexible element that is movable in response to a change in the value of the parameter;
     a reflective surface on the flexible element that forms a movable mirror spaced from the distal end of the second optical fiber and terminating the second optical path so as to reflect the second beam back into the distal end of the second optical fiber, the movable mirror being movable relative to the distal end of the second fiber in response to a change in the value of the parameter;
     optical coupling means for recombining the first and second beams after their reflection back along their respective optical fibers by the fixed and movable mirrors, respectively, so as to form an interference signal; and
     first and second housing portions defining a cavity, wherein the first housing portion includes the flexible element, and wherein the second housing portion has an optical opening for the passage of the second beam for reflection from the reflective surface, and wherein the second optical fiber enters the optical opening at an angle between about 3.4° and about 4.0° with respect to the normal to the plane of the sensor;
   optical detector means, responsive to the interference signal, for generating an electrical signal indicative of the value of the interference signal; and means, responsive to the electrical signal, fiber correlating a change in the value of the interference signal with a change in the value of the parameter.

8. A system for sensing changes in the value of an environmental parameter, comprising an optical signal source;

an interferometer optically coupled to the light source so as to receive an optical signal therefrom, the interferometer comprising:

means for splitting the optical signal into first and second beams;

first and second optical fibers respectively providing first and second optical paths for the first and second beams, respectively, the optical path length through the second optical path being substantially longer than the optical path length through the first optical path, the second optical fiber having a distal end;

a fixed mirror terminating the first optical path so as to reflect the first beam back into the first optical fiber;

a sensor having a flexible element that is movable in response to a change in the value of the parameter;

a reflective surface on the flexible element that forms a movable mirror spaced from the distal end of the second optical fiber and terminating the second optical path so as to reflect the second beam back into the distal end of the second optical fiber, the movable mirror being movable relative to the distal end of the second fiber in response to a change in the value of the parameter;

optical coupling means for recombining the first and second beams after their reflection back along their respective optical fibers by the fixed and movable mirrors, respectively, so as to form an interference signal; and first and second housing portions defining a cavity, wherein the first housing portion includes the flexible element, and wherein the second housing portion has an optical opening for the passage of the second beam for reflection from the reflective surface, and wherein the second optical fiber enters the optical opening at an angle $\alpha$ with respect to the normal to the plane of the sensor, and wherein the second optical fiber terminates in an end face that is configured with an angle $\theta$, wherein $\theta$ is defined as the angle between the end face and an imaginary line that is perpendicular to the axis of the fiber, and wherein the angle $\theta$ is between about 8° and about 15°;

optical detector means, responsive to the interference signal, for generating an electrical signal indicative of the value of the interference signal; and means, responsive to the electrical signal, for correlating a change in the value of the interference signal with a change in the value of the parameter.

* * * * *